Figure 1:
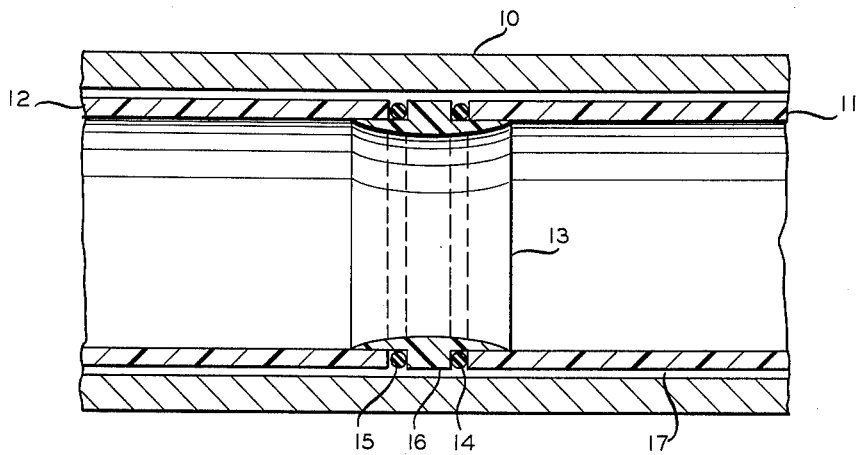

Feb. 15, 1966  L. JACOBY  3,235,291
COUPLING FOR A THERMOPLASTIC LINER IN A METAL CONDUIT
Filed April 29, 1963

INVENTOR.
LEWIS JACOBY
BY Young and Quigg
ATTORNEYS

United States Patent Office 3,235,291
Patented Feb. 15, 1966

3,235,291
COUPLING FOR A THERMOPLASTIC LINER IN A METAL CONDUIT
Lewis Jacoby, Eureka, Kans., assignor to Phillips Petroleum Company, a corporation of Delaware
Filed Apr. 29, 1963, Ser. No. 276,227
3 Claims. (Cl. 285—55)

This invention relates to conduit having a thermoplastic lining for protection of the conduit from corrosion in service wherein corrosive fluids are transported through the conduit. The invention also relates, in another aspect, to a thermoplastic conduit enclosed in a reinforcing metal, or other pressure resistant material, casing. Still another aspects of the invention is in a method for securing a thermoplastic liner in a pressure resistant conduit.

For many years pipes and other conduits have been lined with hydraulic cement and such cement-lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes occur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported cement-lined steel pipe has been found to be very little better than unlined steel pipe. Such bacteria have been found beneath the cement lining of cement-lined pipe; however, if the cement lining allows the fluids being transported to come in contact with the metal pipe, corrosion can result in galvanic action or chemical action in addition to attack by bacteria.

Resinous or plastic materials such as polyvinylchloride, solid polyolefins, nylon, natural and synthetic rubber, and the like, have been proposed for use in conduits transporting corrosive fluids; however, such materials lack the tensile strength required for high pressure service and therefore the use of such materials has been limited.

Various proposals have been made for combining thermoplastic linings with materials such as hydraulic cements, e.g., hydraulic cement or other material occupying the annulus between the metal conduit and the thermoplastic lining of the conduit. Some of these proposals have proven successful in controlling the corrosion of steel pipe in corrosive service; however, the expense involved in producing such conduit has prevented widespread use. Furthermore, conduits containing hydraulic cement liners or partial liners must be protected from blows or vibration which would fracture the cement. It has also been proposed to employ thermoplastic linings in conduits with no material added to the annulus between the liner and the conduit so that when pressure is applied to the interior of the lining, the lining expands slightly so as to occupy the entire inside dimension of the metal conduit and to depend upon the strength of the metal conduit for support of the thermoplastic liner. Such proposal has necessitated welding together the sections of thermoplastic tubing which comprise the liner of the metal conduit.

I have now discovered a method and means for connecting together sections of thermoplastic tubing for use as a liner within metal conduit whereby the sections are coupled quickly and easily in such manner that they can be uncoupled and reassembled repeatedly. The coupling member of the invention comprises a relatively short sleeve having an outside diameter slightly smaller than the inside diameter of the plastic tube so that it can be easily and quickly inserted into the thermoplastic tube and also having at about the center of its circumferential periphery a shoulder whose height is about equal to the wall thickness of the thermoplastic tubing. A resilient O-ring is placed over the sleeve on each side of and adjacent to the shoulder. The sections of thermoplastic tubing which form the liner for the conduit are coupled together with the coupling member described, usually as the sections of metal conduit are assembled. It is, of course, necessary to secure and seal each terminal end of the thermoplastic liner and this securing of the terminal ends can be accomplished by any of the known methods for sealing the end of a thermoplastic liner to the end of the lined conduit, for example, by a flanged connection wherein the thermoplastic liner end is turned outwardly and over the flange half attached to the lined pipe so that when the flanged connection is made up the end of the liner is firmly anchored to the flange and a seal is effected between the thermoplastic liner and the lined pipe.

Figure 2:
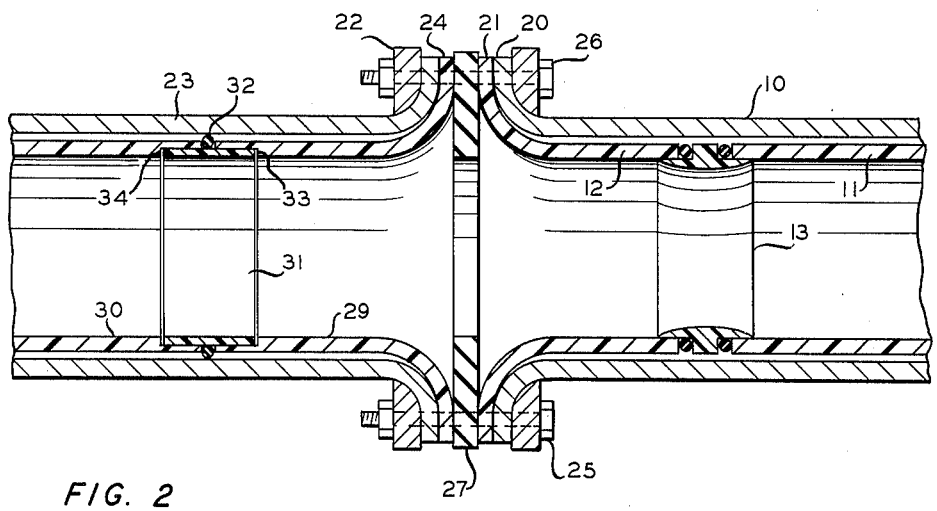

A principal object of this invention is to provide a simple and economical method for effecting a coupling between sections of thermoplastic liner in a lined conduit. It is also an object to provide a simple and economical coupling member for securing together sections of a thermoplastic conduit. Other and further objects and advantages will be apparent to one skilled in the art upon consideration of the description of the invention and the attached drawing wherein:

FIGURE 1 is a sectional elevation of a lined conduit and the coupling of the invention; and FIGURE 2 is a sectional elevation of a lined conduit showing the liner coupling of the invention and one method for sealing the terminal end of a lined conduit.

Referring now to FIGURE 1, a metal conduit section 10 contains a thermoplastic liner comprising sections 11 and 12. Thermoplastic sleeve member 13 effects a snug fit within the end portions of thermoplastic tubular sections 11 and 12. O-rings 14 and 15 are compressed between shoulder 16 on sleeve 13 and the ends of thermoplastic tubes 11 and 12. The annulus 17 between conduit 10 and thermoplastic sections 11 and 12 will be kept at a minimum by selecting a liner size as large as can be easily inserted into the metal conduit. It is not necessary that the sleeve 13 fit tightly within the ends of the tubes 11 and 12 because the seal is accomplished by compressing the O-rings 14 and 15 between the shoulder 16 and the ends of the tube sections 11 and 12. With the terminal ends of the liner anchored an increase in the internal pressure within the thermoplastic liner will result in an increase of compressive force applied against the O-rings.

FIGURE 2 illustrates one method of terminating a thermoplastic liner within a metal conduit. The end of conduit 10 terminates in a half flange 20 and the end portion 21 of thermoplastic tubular section 12 is turned outwardly over the face of the half flange 20. The other half flange 22 can be attached to a corrosion resistant fitting, a section of cement-lined pipe or can be connected to another section of thermoplastic-lined pipe or conduit as represented by conduit 23 and liner 24. The flange halves can be secured together in a conventional manner as by bolts 25 and 26. A suitable gasket 27 can be employed to effec- a seal at the flanged connection. Neoprene represents a material which can ordinarily be utilized as a gasket.

The end portions of the sleeve 13 are preferably beveled or tapered, on the inside, to a relatively thin edge so as to present a streamlined surface to fluid flowing through the conduit. This feature is not, however, essential because the wall thickness of the sleeve, excluding the shoulder portion, will normally be small so that a small obstruction is presented to the flowing fluid if the end of the sleeve is left square. The wall thickness of the sleeve need only be sufficient to maintain the shoulder portion 16 positioned between the plastic liner conduit ends in sealing contact with the O-rings 14 and 15.

If it is desired to maintain a constant inside diameter of the liner, without the slight obstruction caused by the sleeve 13, the ends of the liner sections can be counterbored as indicated at 33 of liner section 29 and at 34 of liner section 30 of FIGURE 2. A sleeve 31, having an inside dimension equal to that of liner sections 29 and 30 and an outside dimension which will allow a sliding fit in the counter-bored sections of liners 29 and 30 can be employed to support a single resilient O-ring or gasket between the ends of liner sections 29 and 30. This modification of the invention is less preferred because a counterboring operation is required on each section of liner, whereas the sleeve 13 of FIGURE 1 can be used with any section of liner having a relatively square cut end. Furthermore, the sleeve 13 does not require a reduction in the wall thickness of the liner. The shoulder 16 of sleeve 13 can be omitted, if desired, and one resilient O-ring or resilient gasket can be then employed to effect a seal between the adjacent ends of the liner sections. This modification, however, relies entirely on friction to position the sleeve in the liner sections.

The following example is illustrative of the operation of the invention but should not be used to limit the invention unduly.

EXAMPLE

Five sections of a copolymer of ethylene and 1-butene made according to the method described in U.S. Patent 2,825,721, issued March 4, 1958, to J. P. Hogan et al., were secured together with four sleeve and O-ring coupling devices as shown in FIGURE 1. The coupled sections were inserted in a threaded steel conduit and the ends were closed with threaded pipe caps each containing a neoprene gasket. The liner projected ¼-inch beyond the conduit before assembly so that the O-rings were compressed that amount (⅛-inch each) when the assembly was completed. One of the caps was tapped to receive a pipe connection for admission of pressure fluid. A pressure gage was connected through the conduit wall, to the annulus between the plastic liner and the steel conduit. The interior of the plastic liner was filled with light lubricating oil through the connection in the cap and 1100 p.s.i. pressure was applied to the oil in the liner by means of a dead weight tester for testing pressure gages. The pressure was maintained for 64 hours and there was no indication of leakage from the liner into the annulus by either the dead weight tester or the gage connected to the annulus. No indication of leakage or plastic liner distortion was noted when the equipment was disassembled. The dimensions of the elements are tabulated below.

Table

| Element | Length, Inches | Inside Dimension, Inches | Outside Dimension, Inches |
|---|---|---|---|
| Steel Conduit | 36 | 2.469 | |
| Sleeve Body | 2.5 | 1.75 | 1.875 |
| Sleeve Shoulder | 0.75 | 1.75 | 2.375 |
| O-ring (cross section=0.125 inch) | | | |
| Liner Sections | ¹ 7.09 | 1.875 | 2.375 |

¹ Approximate.

The above demonstrates that an effective seal is obtained in coupled sections of thermoplastic liner for pressure-resistant conduit.

Resilient O-ring gaskets are preferred for effecting a seal between the liner section ends because of their greater sealing power; however flat or square ring gaskets can be used if desired. Any inert, resilient, imprevious material can be used for fabricating the gaskets, such as natural rubber or synthetic rubber. Neoprene is a satisfactory synthetic rubber in wide use in sealing operations. Other suitable materials include resilient polymers such as polypropylene and high pressure polyethylene.

That which is claimed is:

1. A coupling apparatus for joining together adjacent sections of a hollow thermoplastic liner disposed in a pressure-resistant conduit which consists essentially of a counter bored section in each adjacent end of said sections of liner; a sleeve disposed in said counter bored sections with a sliding fit; a resilient ring gasket positioned on the periphery of said sleeve and compressed between adjacent ends of said liner sections; and means to anchor the terminal ends of the liner to said conduit.

2. In a pressure-resistant conduit having a hollow liner composed of adjacent sections of thermoplastic conduit slidably positioned in said pressure-resistant conduit, the improvement consisting essentially of a counter bored section in each adjacent end section of said thermoplastic conduit; a sleeve disposed in said counter bored sections with a sliding fit; a resilient ring gasket positioned on the periphery of said sleeve and compressed between adjacent ends of said sections of thermoplastic conduit; and means to anchor the terminal ends of said liner to said pressure-resistant conduit.

3. A coupling apparatus for joining together adjacent sections of a hollow thermoplastic liner in a pressure-resistant conduit consisting essentially of a counter bored section in each adjacent end of said sections of thermoplastic liner; a sleeve of thermoplastic material disposed in said counter bored sections and having an internal diameter substantially equal to that of said liner; a resilient ring gasket circumferentially positioned on said sleeve and compressed between adjacent ends of said sections of liner; and means to anchor the terminal ends of said liner to said pressure-resistant conduit.

References Cited by the Examiner
UNITED STATES PATENTS

| | | | |
|---|---|---|---|
| 587,347 | 8/1897 | Waite | 285—332.2 |
| 2,735,699 | 2/1956 | Chadbourne. | |
| 2,762,904 | 9/1956 | Thomas | 285—370 |
| 2,912,263 | 11/1959 | Christy | 285—347 X |
| 2,982,311 | 5/1961 | Haskell | 285—55 X |
| 3,074,748 | 1/1963 | Ulrich | 285—347 |

FOREIGN PATENTS

| | | |
|---|---|---|
| 1,084,115 | 1/1955 | France. |
| 1,218,368 | 5/1960 | France. |
| 564,671 | 6/1957 | Italy. |
| 136,459 | 11/1929 | Switzerland. |

CARL W. TOMLIN, *Primary Examiner.*